United States Patent [19]

Wittke

[11] 4,090,777
[45] May 23, 1978

[54] METHOD OF ALIGNING OPTICAL FIBERS WITH LIGHT EMITTING OPTICAL DEVICES

[75] Inventor: James Pleister Wittke, Princeton, N.J.

[73] Assignee: RCA Corporation, New York, N.Y.

[21] Appl. No.: 732,069

[22] Filed: Oct. 13, 1976

[51] Int. Cl.$^2$ .......................... G02B 5/14; B29D 11/00
[52] U.S. Cl. ................................. 350/96.15; 427/163; 427/165; 427/168
[58] Field of Search ............. 350/96 WG, 96 C, 96 B; 427/163, 165, 168

[56] References Cited

U.S. PATENT DOCUMENTS

| | | | |
|---|---|---|---|
| 3,912,362 | 10/1975 | Hudson | 350/96 C |
| 3,999,834 | 12/1976 | Ohtomo et al. | 427/163 |

OTHER PUBLICATIONS

Coupling Losses Between Laser Diodes and Multimode Glass Fibres by Schicketanz et al., Optics Communication, Jul. 1972, vol. 5, No. 4, pp. 291–292.

*Primary Examiner*—John K. Corbin
*Assistant Examiner*—Stewart Levy
*Attorney, Agent, or Firm*—H. Christoffersen; Birgit E. Morris

[57] ABSTRACT

This invention relates to a method of aligning the core of a thin optical fiber with a light emitting optical device. Prior to alignment a thin, continuous high index of refraction layer is formed on a stripped end segment of the optical fiber. The layer is formed by applying a solution of a volatile solvent and high index of refraction polymer to the stripped segment and evaporating the solvent before beading of the polymer solution occurs. The core of the fiber can then be aligned with the light emitting optical device by observing light exit the optical fiber.

7 Claims, No Drawings

METHOD OF ALIGNING OPTICAL FIBERS WITH LIGHT EMITTING OPTICAL DEVICES

The Government has rights in this invention pursuant to Contract No. N00014-76-C-0709 awarded by Department of the Navy.

BACKGROUND OF THE INVENTION

Optical fibers, such as fused silica optical fibers comprised of center cores of $GeO_2$-doped silica and cladding layers of silica, will waveguide light in the cores due to the lower index of refraction of the cladding layers. In the communications industry, optical fibers are being utilized to transmit information in the form of modulated coherent light beams. To reduce distortion of the transmitted light beam, optical fibers having cores of approximately 1 to 5 micrometers (microns) in diameter have been developed. To provide for ease of handling, the cladding layers are approximately 100 micrometers in diameter.

The optical fibers are further covered with a protective polymer coating about 10 to 15 micrometers thick to prevent surface cracking of the fibers. The optical fibers as commercially available have protective layers of polymers such as polyvinylidene chloride which are easily applied to the fibers. These polymers generally have indexes of refraction lower than the cladding layer which permits waveguiding in the cladding layers as well as the cores.

Waveguiding in the cladding layers presents a problem when the small diameter cores of the optical fibers are to be coupled with light emitting optical devices, such as laser diodes or optical fibers emitting light from a laser source. Prior to coupling, a light emitting facet of the optical device must be aligned with the small diameter core of the optical fiber. Alignment can be accomplished by positioning the light emitting facet of the optical device near the fiber core and moving the fiber relative to the optical device until laser light is observed to exit from the other end of the optical fiber. When the larger cladding layer is also waveguiding light, it is impractical to determine if the optical device is aligned with the core or the cladding layer.

A cumbersome method has been employed to assure that the cores, rather than the cladding layers, of the optical fibers are aligned with optical devices when the fibers have a low index of refraction protective coating. The protective layers are first stripped from an end segment of the fiber. The cladding layer will continue to waveguide light since the surrounding air has an index of refraction lower than the cladding layer. To prevent waveguiding in the cladding layer, the layer is surrounded by a high index of refraction liquid. Due to the thin cross-section of the fiber and the surface tension of the liquid, the liquid tends to bead rather than coat the fiber. Thus merely dipping the stripped section of the fiber in the liquid is insufficient, and the stripped fiber must be completely submerged in the liquid. Alignment is thus an awkward process. After alignment, the fiber section is removed from the liquid leaving a short unprotected segment of optical fiber susceptible to surface cracking.

High index of refraction coatings such as polyurethane have been applied to stripped optical fibers in attempts to eliminate waveguiding in the cladding layers. When polyurethane coatings have been applied in laboratory or field settings to align the fibers, the polyurethane is reacted on the stripped fibers. Incomplete covering, however, generally results which does not prevent waveguiding. The incomplete covering is due to beading of the polyurethane before it sets. In the few instances when a complete coating was obtained, the coating was thick and highly irregular and, therefore, not compatible with small diameter fiber systems and not suitable for coupling methods utilizing mechanical clamping.

SUMMARY OF THE INVENTION

It has been found that the core of a thin optical fiber having a low index of refraction protective layer can be aligned in a simplified manner with a light emitting optical device. The protective layer is stripped from an end segment of the optical fiber, and a solution comprised of a volatile solvent and a polymer having an index of refraction higher than the cladding layer is applied to the stripped segment. A thin continuous, high index of refraction layer is formed, before beading occurs, by evaporation of the solvent. The formed layer is found to be flexible, relatively uniform and protective against surface cracking. The core of the optical fiber is then aligned with the light emitting facet of an optical device by positioning the core near the light emitting facet and observing light exit the opposite end of the optical fiber.

DETAILED DESCRIPTION OF THE INVENTION

A low index of refraction protection polymer coating is first removed from a thin optical fiber, comprised of a core and a cladding layer, by conventional means, such as dissolving the coating in a suitable solvent, e.g. acetone. Only a short segment of approximately 2 to 5 cm in length need be removed.

A solution is prepared from a high index of refraction polymer dissolved in a volatile solvent. The polymers useful herein must have an index of refraction higher than the cladding layer and be capable of forming a thin and continuous layer on the stripped segment. When an optical fiber comprised of a $GeO_2$-doped silica core and a pure silica cladding layer having an index of refraction of 1.45 is employed, suitable high index of refraction polymers with their corresponding indexes of refraction are poly(methyl methacrylate), 1.49; polystyrene, 1.59; polycarbonate, 1.59; and methyl methacrylate/styrene copolymers, 1.56.

The volatile solvent must be non-reactive with the polymer, must be capable of dissolving the polymer and must evaporate rapidly under atmospheric pressure, allowing the polymer to set before it beads. Suitable solvents are aliphatic, aromatic and chlorinated hydrocarbons. For example, when poly(methyl methacrylate) is employed, suitable solvents are toluene and methylene chloride. The amount of solvent must be sufficient to provide a fluid solution, but an excessive amount of solvent will require an unduly lengthy volatilization time. Suitable amounts of solvent for a particular polymer may be readily determined by routine experimentation.

The polymer solution is then applied to the stripped optical fiber by conventional methods such as dipping or spraying.

In a preferred embodiment of this invention, the polymer solution is dispersed from an aerosol spray. The spray contains a mixture of the polymer solution and a propellant, such as highly volatile hydrocarbons or fluorocarbons which are packed under pressure in a hand-size can and released by opening a valve. This provides a simple mechanism for applying a high index of refraction coating to optical fibers and allows for application of these coatings in non-laboratory settings where utilizing more cumbersome equipment would be impractical.

The polymer layers applied by the method of the present invention are advantageous in that they are continuous high index of refraction layers which prevent waveguiding in the cladding layers; are thin layers permitting high fiber packing densities; are flexible to permit bending of the fibers; are protective to prevent surface cracking of the clad fibers; and are uniform to allow for mechanical clamping of the fibers.

The following example is presented to further illustrate the invention, but it is to be understood that the invention is not limited to the details described therein.

EXAMPLE

An optical fiber having a core of $GeO_2$-doped silica with a diameter of 7 micrometers and a cladding layer of silica with a diameter of 100 micrometers was employed. The cladding layer had an index of refraction of 1.45 and was covered with about 10 to 15 micrometers of polyvinylidene chloride which had an index of refraction of 1.42. The protective coating was removed from one end of the fiber by submerging approximately 5 cm of the end of the fiber in acetone. The stripped fiber was then coated with a polymer having an index of refraction higher than the cladding layer by spraying methyl methacrylate from an aerosol spray can onto the stripped end. The aerosol spray was a clear acrylic resin commercially available under the trade name Krylon, number 1301, from the Borden Company of Columbus, Ohio. The aerosol is believed to contain on a weight basis:

(a) about 12 parts of a solvent which was a mixture of about 30% toluene, about 25% methylene chloride, and about 35% of various aliphatic, aromatic, and chlorinated hydrocarbons;

(b) about 1 part of poly(methyl methacrylate) resin such as the material commercially available under the trade name Plexiglas from the Rohm and Haas Company of Philadelphia, Pa.; and (c) about 2.5 parts of a highly volatile hydrocarbon propellant.

The resultant coating was thin, and flexible, and completely covered the stripped fiber. Hence, the fiber core could be aligned without utilizing a high index of refraction liquid system.

I claim:

1. A method of aligning a thin optical fiber comprised of two end segments, a core, a cladding layer, and a low index of refraction protective layer with an optical device wherein the core of the fiber is aligned with a light emitting facet of the optical device which comprises:

(a) stripping the low index of refraction protective layer from an end segment of the optical fiber to expose the cladding layer of the optical fiber;

(b) applying a solution comprised of a volatile solvent and a polymer having an index of refraction greater than the cladding layer to the stripped end segment;

(c) evaporating the solvent to form a thin, continuous, high index of refraction layer on the segment; and (d) positioning the high index of refraction coated segment in proximity to the light emitting facet of the optical device so that light emitted from the optical device exits the other end segment of the optical fiber whereby the core is aligned with the light emitting facet.

2. A method according to claim 1 wherein the optical fiber has a cladding layer comprised of silica.

3. A method according to claim 1 wherein the polymer is selected from the group consisting of poly(methyl methacrylate), polystyrene, polycarbonate, and a methyl methacrylate/styrene copolymer.

4. A method according to claim 1 wherein the polymer is poly(methyl methacrylate).

5. A method according to claim 1 wherein the solvent contains at least about 55% by weight of solvent selected from the group consisting of toluene and methylene chloride.

6. A method according to claim 1 wherein the solution is applied by spraying.

7. A method according to claim 1 wherein the solution is applied by spraying from an aerosol container.

* * * * *